May 29, 1928.  
W. C. STEVENS  
1,671,941  
APPARATUS FOR BUILDING TIRES  
Filed Nov. 13, 1922 9 Sheets-Sheet 1

Inventor  
William C. Stevens  
By A. L. Ely  
Attorney

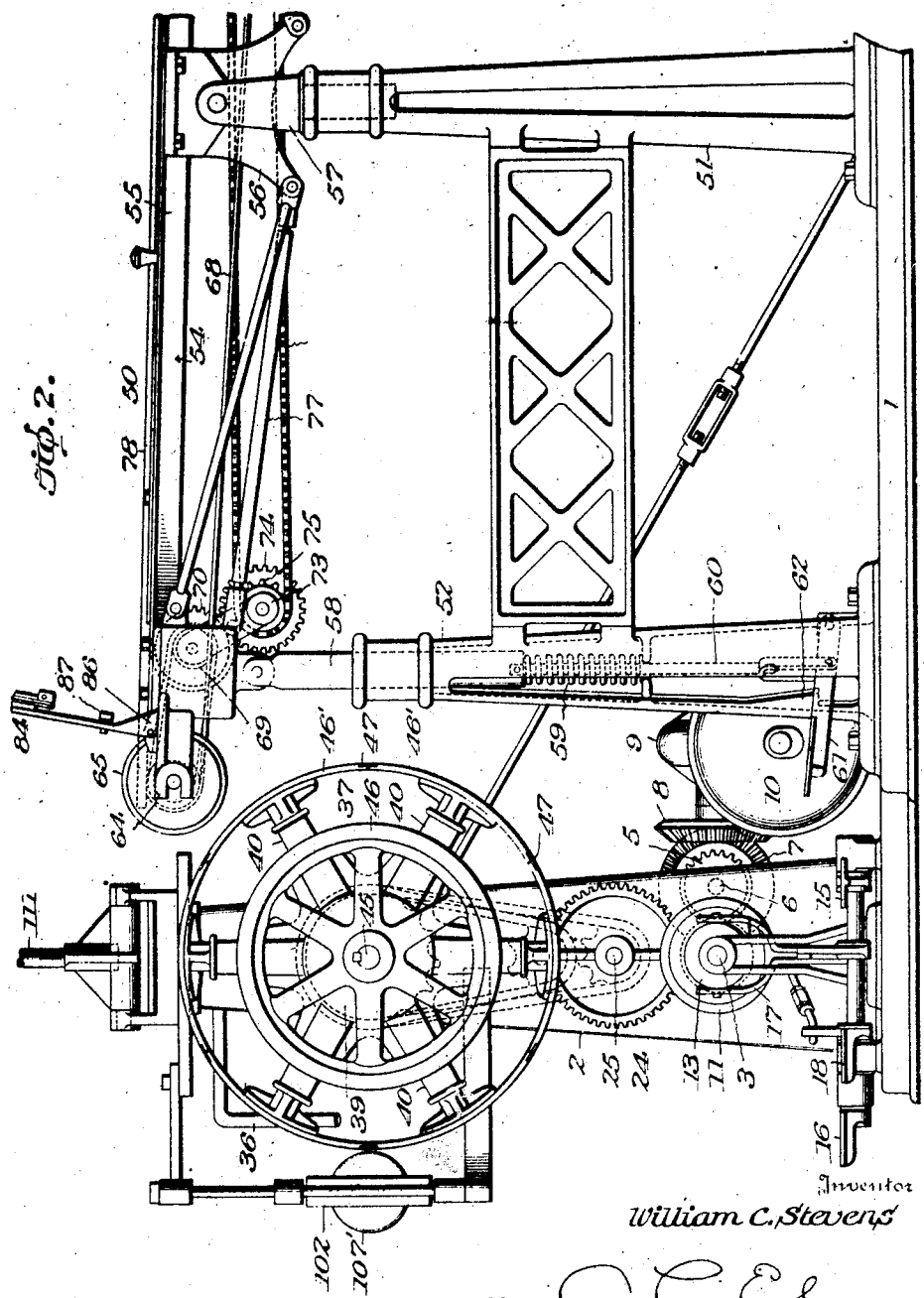

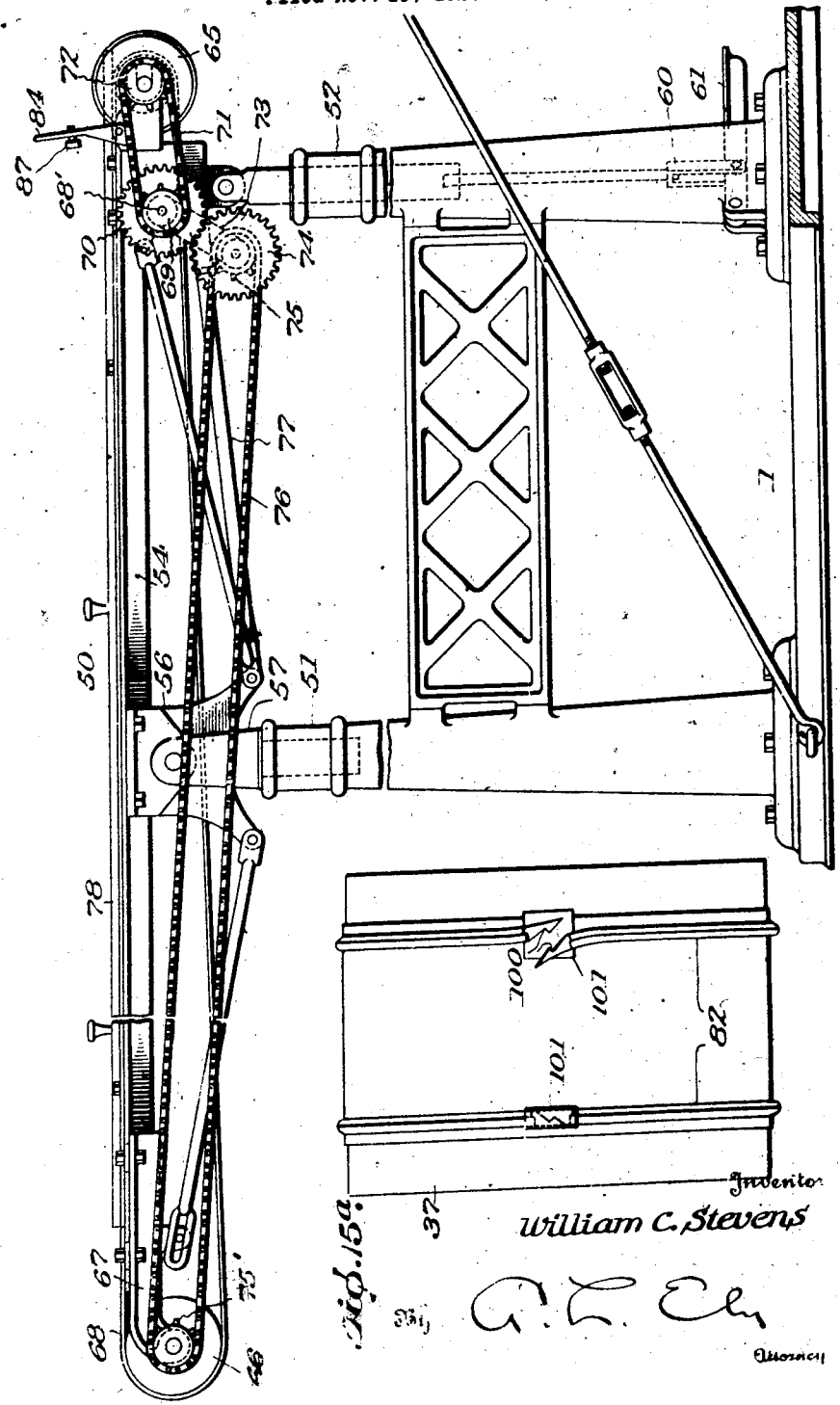

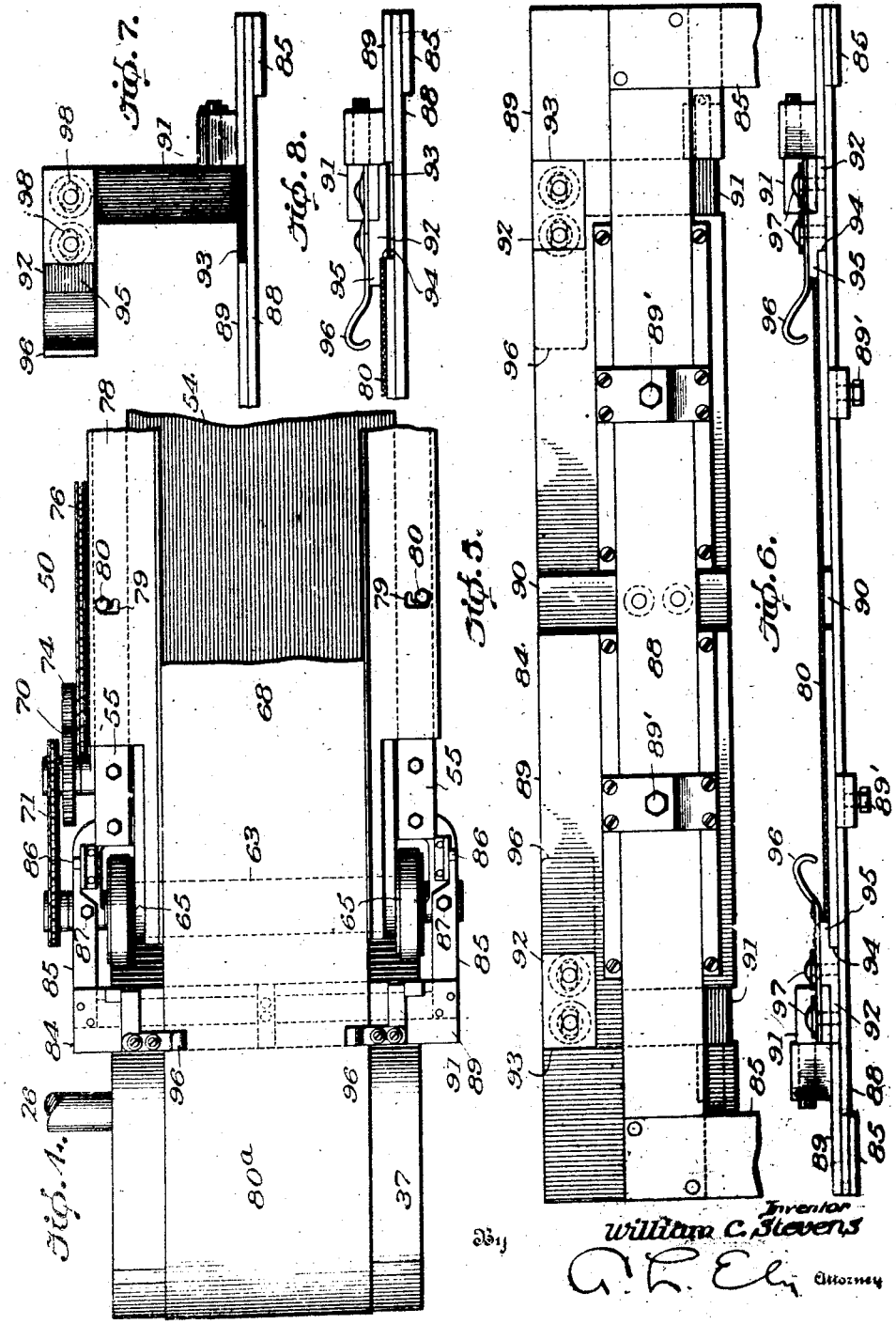

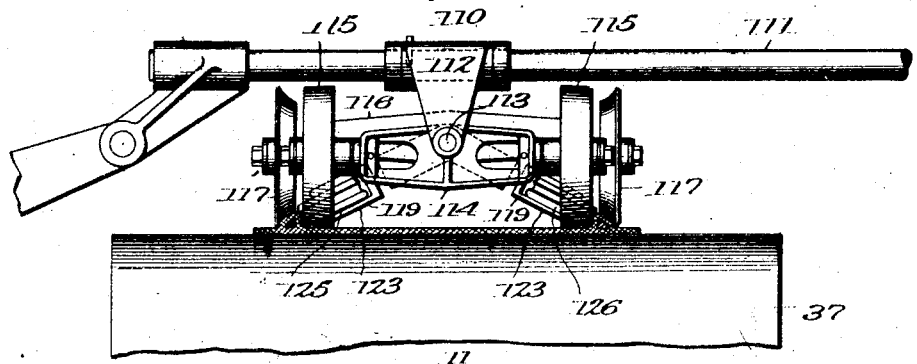
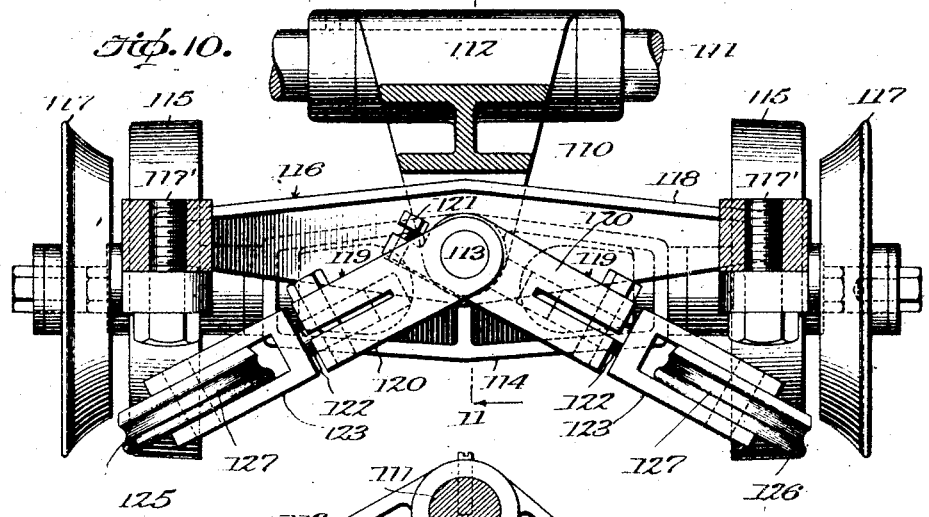
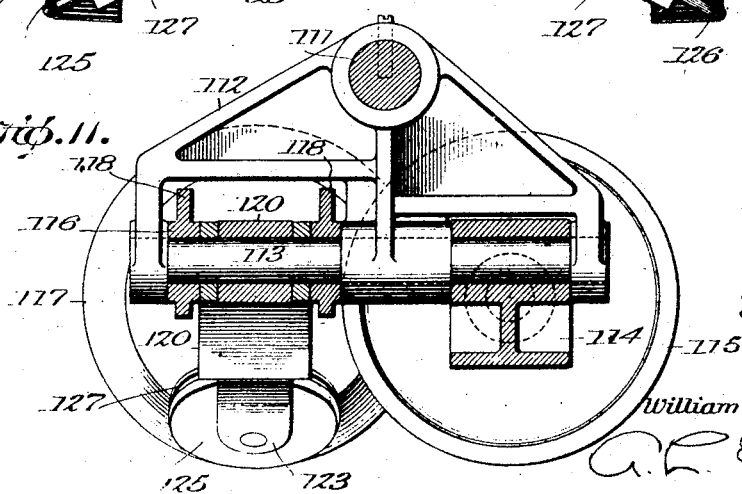

May 29, 1928.

W. C. STEVENS 1,671,941

APPARATUS FOR BUILDING TIRES

Filed Nov. 13, 1922

Inventor
William C. Stevens

Attorney

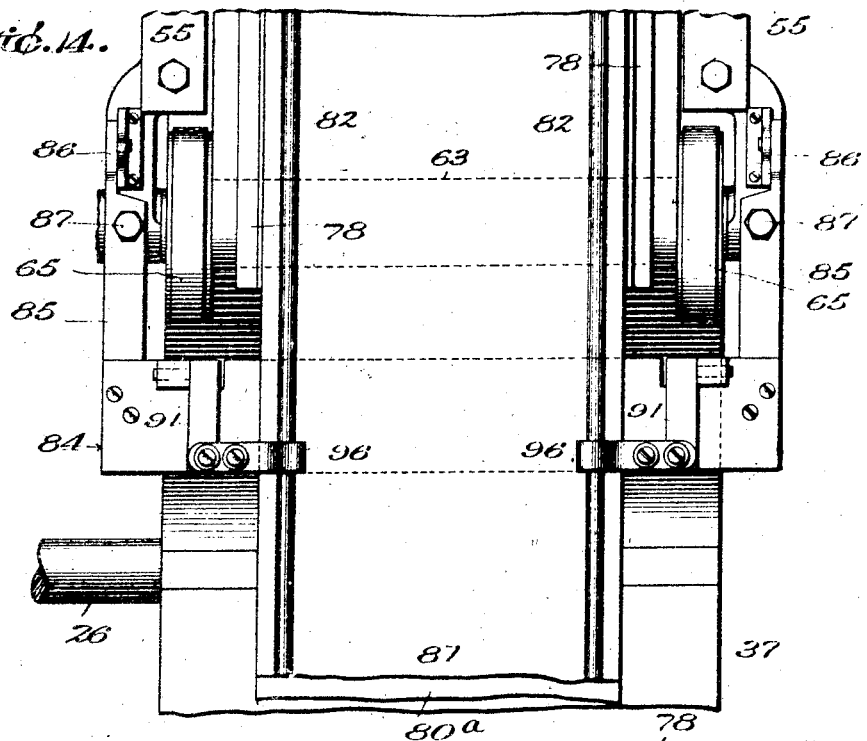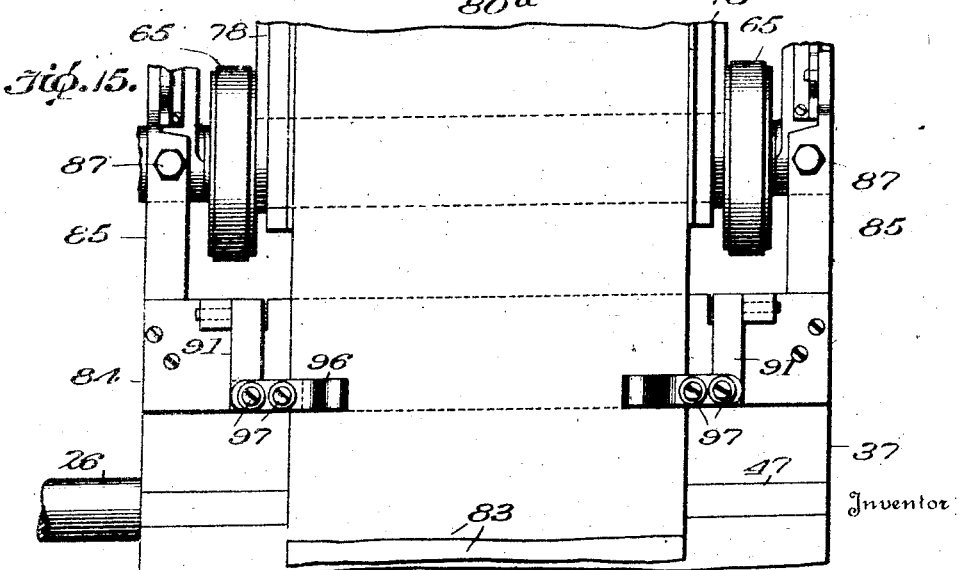

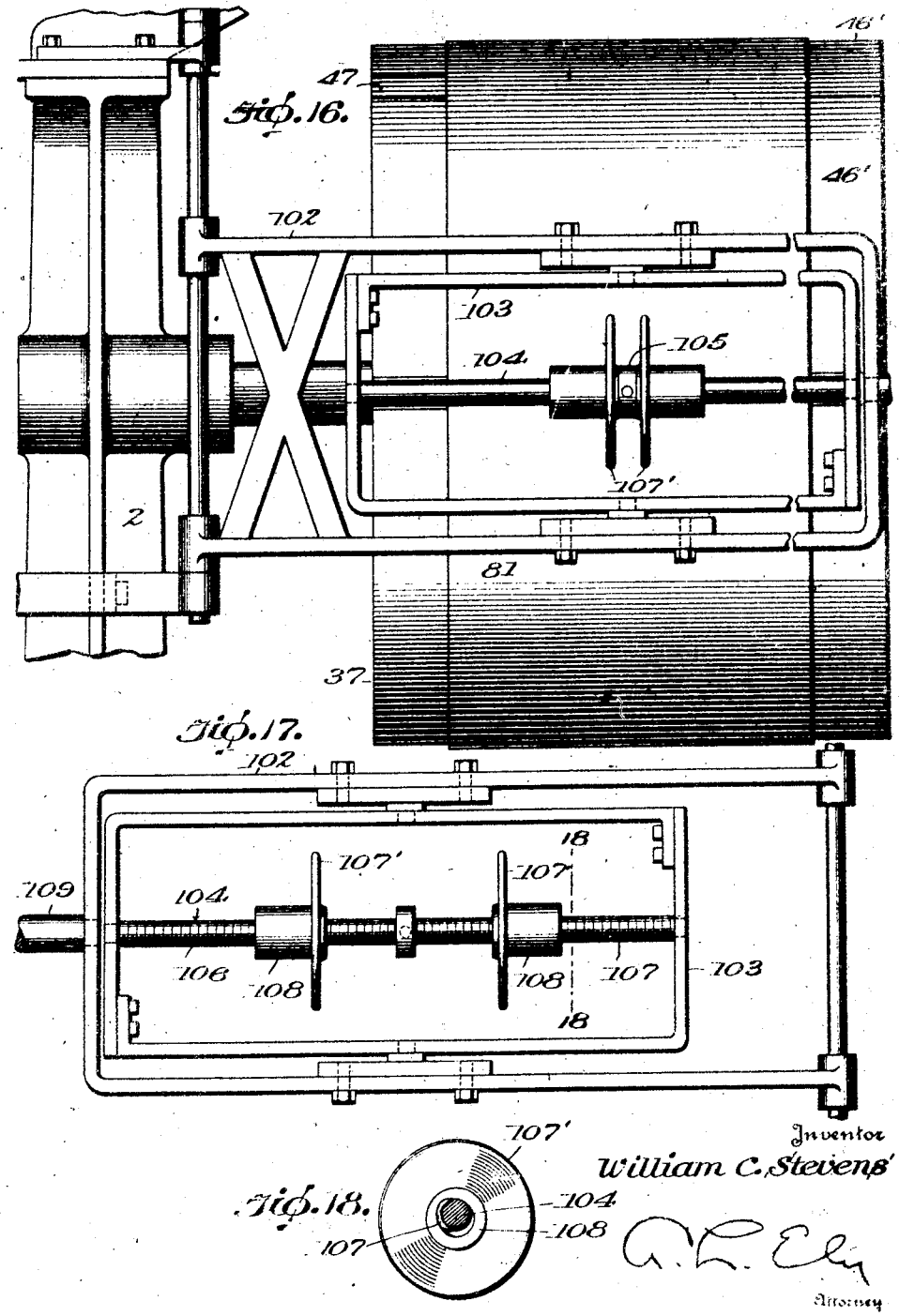

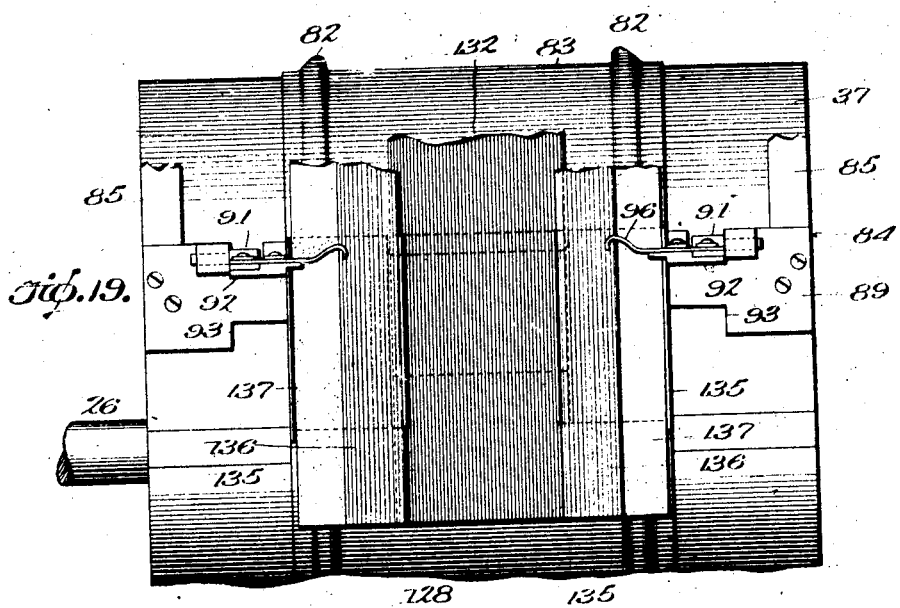
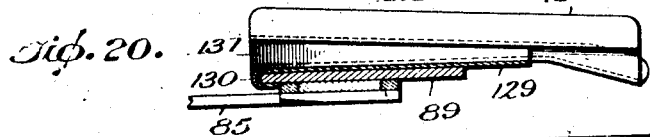
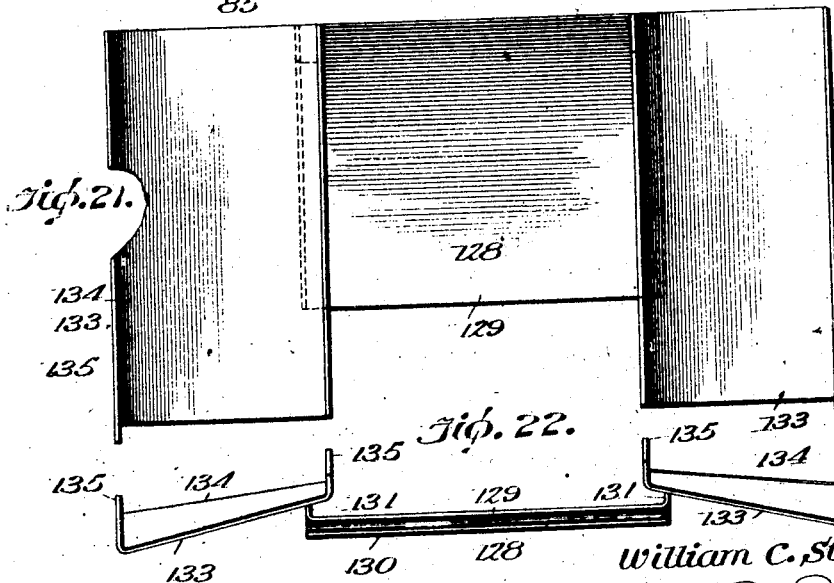

Patented May 29, 1928.

1,671,941

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

APPARATUS FOR BUILDING TIRES.

Application filed November 13, 1922. Serial No. 600,543.

My invention relates, broadly, to improvements in apparatus for building pneumatic tires, and more specifically to apparatus for use in assembling the component parts of a tire and building them up in the form of a flat band.

This method of building tires, generally speaking, comprises assembling the various fabric layers of the tire carcass in the form of a transversely flat band, positioning the bead cores, the tread element, the sidewalls, and the finishing strips upon the band, and then forming the band into the cross-sectional shape of a tire. The last mentioned operation is performed in various ways and need not, it is believed, be entered into herein. Pneumatic tires may be built by the method outlined at a relatively low cost if the operations incident to the assembly of its various components are performed accurately and rapidly and without resorting to individual apparatus in performing different operations and thus necessitating transferring the carcass from one place to another and through the hands of numerous operatives.

The purpose of my invention, generally speaking, is to expedite the construction of pneumatic tires that are built in the form of flat bands and to provide a practical apparatus adapted for use in accomplishing this purpose.

To this end my invention aims to provide apparatus by means of which all the elements of a tire casing may be assembled accurately in the form of a flat band without recourse to unnecessary operations, such as transporting the casing to different apparatus at different stages of its construction.

My invention is also directed toward providing, in conjunction with the above, an improved stitcher mechanism for stitching the various plies of the casing together in the form of a flat band and for performing a like operation upon the tread, sidewalls and finishing strips.

Another object of my invention is to provide a mechanism for stitching the bead cores upon the flat band and also stitching the outer fabric layers around the bead cores.

Still another purpose of my invention is to provide an apparatus of the character above indicated that is adapted to take plies of tire fabric of different widths from stock rolls or other sources of supply and feed them directly to an expansible drum, and to incorporate in such apparatus, means for centering and aligning the various plies relative to each other as they are fed to the drum.

Another purpose of my invention is to provide an expansible flat surfaced drum for building tires in the form of a flat band, and guide elements against the edges of the drum for guiding different widths of fabric onto the drum and spacing the bead cores relative to the edges of the strips.

Other and equally important purposes comprehended by my invention are the provision of novel means for centering the tread portion of the casing relative to the fabric layers, and accurately positioning the sidewalls and chafer strips and the bead core so as to always secure uniform construction in each tire.

With these and still other objects in view, as will presently appear, the invention resides in the aggroupment and combinations of elements set forth, in their preferred construction and relation, in the following description, and particularly pointed out in the claims appended hereto.

In the drawings that accompany and form a part of this specification, the preferred embodiment of my apparatus has been illustrated.

Figure 2 is a side elevational view partly broken away;

Figure 3 is a side elevational view of the conveyor portion of my apparatus;

Figure 4 is a top plan view of a portion of the conveyor mechanism, a guide member, and a drum, forming a part of my apparatus;

Figure 5 is a bottom plan view showing the guide member on an enlarged scale;

Figure 6 is a front edge view of the guide member;

Figure 7 is a fragmentary front edge view of the guide member showing the inoperative position of a combined fabric and bead spacing element forming a part of the guide;

Figure 8 is a similar view showing the operative position of the combined fabric and bead spacing element;

Figure 9 is a front elevational view illustrating a bead stitching mechanism forming a part of my apparatus;

Figure 10 is a rear elevational view, partly in section, of the bead stitching mechanism drawn on an enlarged scale;

Figure 11 is a transverse sectional view on the line 11—11 of Figure 10;

Figure 14 is a fragmentary top plan view on a further enlarged scale, illustrating the manner in which the initial plies of a tire casing and the bead cores are run from the conveyor onto the drum;

Figure 15 is a similar view illustrating the manner in which other plies are run onto the drum over the bead cores;

Figure 15$^a$ is a diagrammatic view illustrating a preferred method of joining the ends of the bead cores;

Figure 16 is a front elevational view on an enlarged scale, illustrating a ply stitching mechanism embodied in my apparatus;

Figure 17 is a rear elevational view of the stitcher mechanism shown in Figure 16;

Figure 18 is a transverse sectional view on the line 18—18 of Figure 17;

Figure 19 is a fragmentary top plan view illustrating the application of a tread and sidewall guide forming a part of my apparatus;

Figure 20 is a central transverse sectional view of the tread and sidewall guide, drawn on an enlarged scale with reference to the showing of Figure 19;

Figure 21 is a top plan view of the tread and sidewall guide;

Figure 22 is a front elevational view of the tread and side wall guide; and

Figure 23:
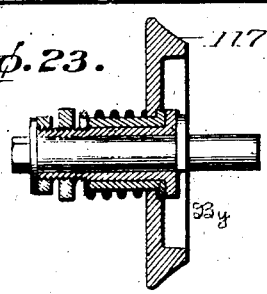
Figure 12:
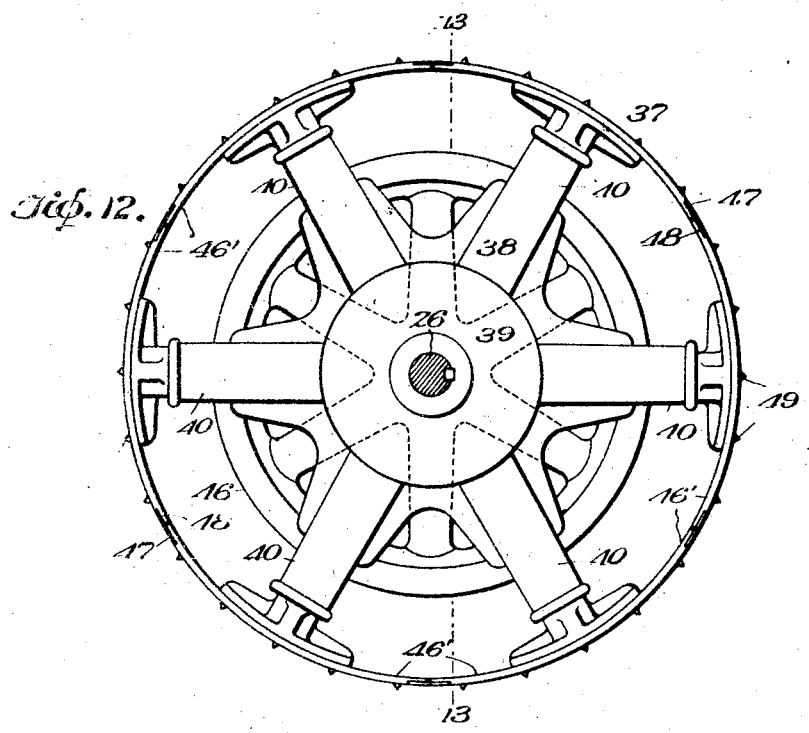
Figure 12 is a rear elevational view of an expansible drum forming a part of my apparatus.
Figure 13:
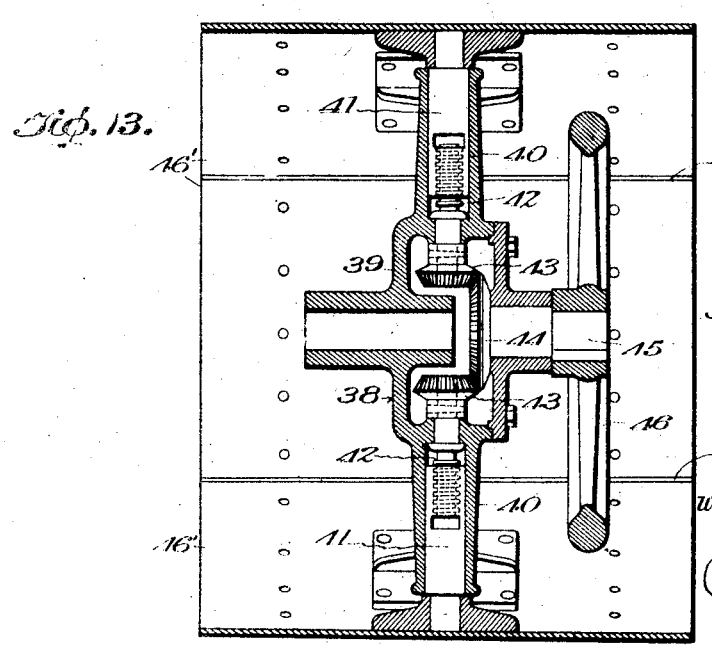
Figure 13 is a transverse sectional view on the line 13—13 of Figure 12.

Figure 23 is a detail view of a modified form of stitcher for the bead stitching mechanism.

Figure 1:
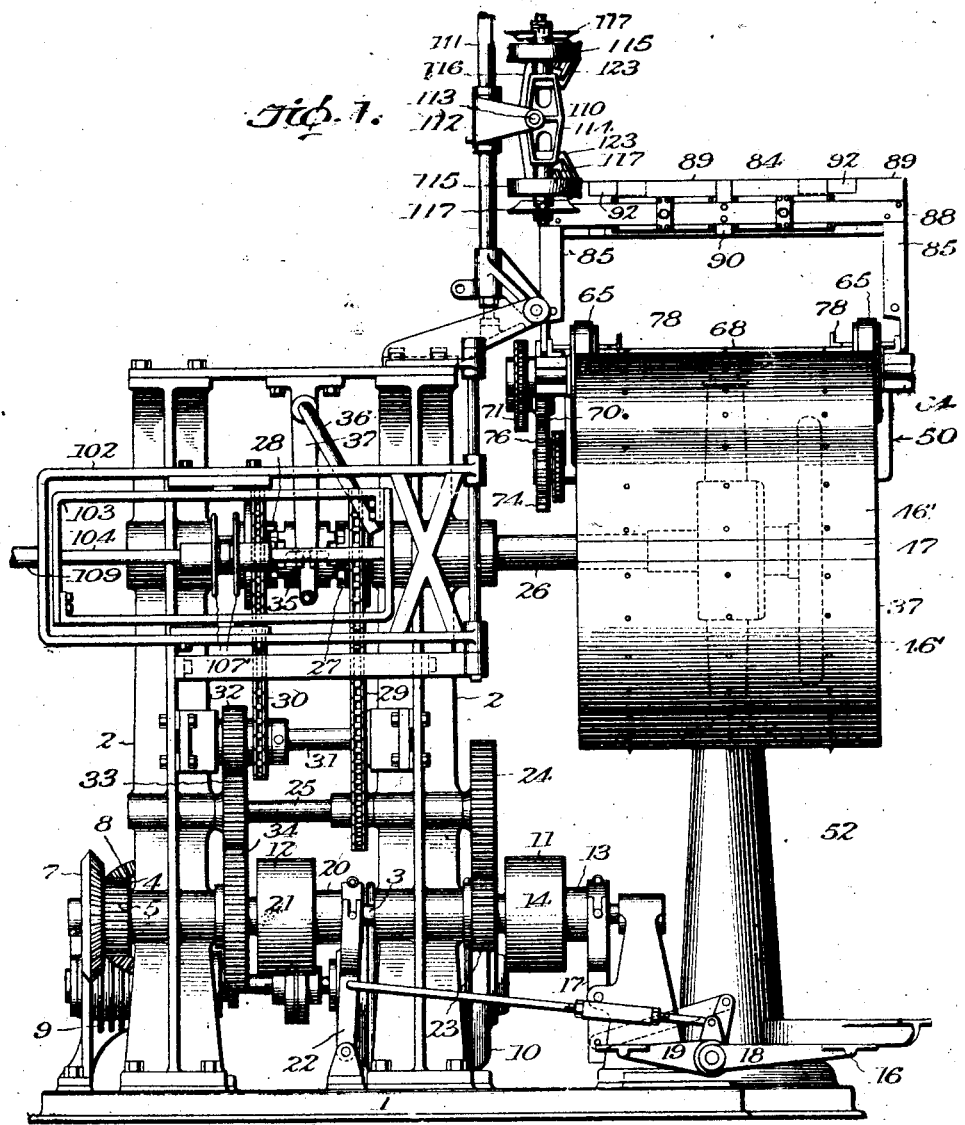
Figure 1 is a front elevational view of the apparatus.

Referring to the drawings by characters of reference, the numeral 1 designates a base-member upon which the various elements of my apparatus are supported in operative relation. At the front end of the base a pair of vertical relatively spaced standards 2 are provided, in which a horizontal driving shaft 3 is journaled, as shown in Figure 1. The outer end of the shaft 3 carries a gear wheel 4 that meshes with a similar gear 5 fixed upon a short shaft 6. The shaft 6 is also journaled in one of the standards 2 and carries a beveled gear 7 in mesh with a similar gear 8. The gear 8 is fixed upon the driven shaft of a speed reducing device 9. Any suitable power medium, such as the motor 10, may be utilized for driving the speed reducing device 9. The driving shaft 3 carries two clutch members 11 and 12 respectively, which may be of any suitable construction. In the present form of my invention, a standard form of clutch has been illustrated, generally, comprising, in each instance, a driving member splined upon the shaft 3 for movement longitudinally thereof and a driven member freely rotatable upon the shaft. In the form of clutch shown, the elements thereof are self releasing.

The driving member 13 of the clutch element 11 is actuated to clutch the driven member 14 by a suitable arrangement of pedals 15 and 16 which actuate a pivoted yoke member 17 that engages the member 13. These pedals are arranged for operation respectively from the front and the side of the machine for the convenience of the operator. A similar arrangement of pedals 18 and 19 serve to actuate the driving member 20 of the clutch 12 relative to driven member 21 thereof. Pedals 18 and 19 are connected in any suitable manner to a second yoke member 22 that engages the member 20 of the clutch 12. The driven member of clutch 11 carries a gear wheel 23 that meshes with a larger gear wheel 24 fast upon a shaft 25. The shaft 25 is journaled above the shaft 3 in the standards 2. Above the shaft 25 a third shaft 26 is journaled in the standards 2. Shaft 26 carries a pair of freely rotatably opposed clutch elements 27 and 28 respectively, mounted thereon in spaced relation. The element 27 is driven in one direction from the shaft 25 by a sprocket and chain connection 29, whereas the element 28 is driven in a reverse direction by a sprocket and chain connection 30 to a stud shaft 31. Shaft 31 carries a gear wheel 32 fast thereon, which is driven by an idler gear 33. The idler gear 33 is mounted for free rotation upon the shaft 25 and meshes with a gear wheel 34 that is carried by the driven member 21 of the clutch 12. A clutch sleeve 35 is splined upon the shaft 26 for movement longitudinally thereof between the clutch elements 27 and 28. The sleeve 35 is adapted to clutch either element 27 or 28 and may be moved into engagement with either said elements by means of a lever 36 and swinging yoke 37, the latter engaging said sleeve as shown in Figure 1.

The foregoing constitues a forward and reverse driving mechanism for the shaft 26.

The inner end of shaft 26 projects beyond one of the standards 2 and supports a flat surfaced drum 37 for rotation therewith. The drum 37 comprises a spider 38 having a hollow hub portion 39 adapted to be affixed upon the aforesaid projecting end of the shaft 26. A plurality of tubular arms 40 extend radially from the hub 38, each of which contains a spoke member 41. The inner end of each spoke is provided with a threaded bore which receives a threaded radial shaft 42. Each shaft 42 is journaled in the hollow hub 38 and carries at its inner end a beveled gear 43. The beveled gears 43 are all in mesh with a master gear 44 carried upon one end of a shaft 45 that is also journaled in the hub portion 38. The other end of the shaft 45 is provided with a hand wheel 46 whereby the master gear 44 may be rotated to rotate the shafts 42 in unison and project or withdraw the spokes 41 out of or into the arms 40. The drum 37 is divided into segments 46' having parallel transverse edges. One segment 46' is carried upon the outer end of each spoke 41, whereby when the spokes 41 are projected or withdrawn relative to the arms 40, the diameter of the drum 37 is increased or diminished. One edge of each segment 46' carries a plate 47 flush with the surface of the segment and projecting beyond the edge thereof into a seat 48 in the edge of the adjacent segment, whereby the edges of contiguous segments are bridged in such manner that when the spokes 41 are projected from the arms 40 the gaps between the segments are closed. Rows of sharp studs 49 are provided in the drum 37 for a purpose presently apparent.

The drum 37 is designed to receive the component parts of a tire casing which are stitched thereon into a composite structure in the form of a flat annular band. Subsequently the band may be formed into the cross-sectional contour of a tire in any suitable manner. I propose to convey the various parts of a tire onto the drum either in strip form or from various stock rolls as desired, and to perform the various stitching operations necessary all through the medium of the present apparatus and without removing the band from the drum in any of the stages of its construction. In accomplishing the foregoing, I provide a conveyor mechanism 50 in the rear of the drum 37.

The conveyor mechanism comprises a pair of hollow standards 51 and 52, spaced from each other, and arising from the base 1, in the plane of the drum 37. The standard 51 carries an elongated substantially horizontal table 54 disposed with its front end overhanging the drum 37. At the rear end of the table suitable standards (not shown) may, if desired, be arranged to support stock rolls of the various elements of the tire. The table 54 comprises parallel side bars 55 which are bolted intermediate their length to a depending transversely extending bracket 56. The bracket 56 is pivoted in a yoke 57 to rock about a horizontal axis whereby the forward end of the table may be depressed or raised relative to the surface of the drum 37 for a purpose presently apparent. The yoke 57 is mounted in the upper end of the standard 51. At its forward end the table is pivotally connected to a vertical plunger rod 58 that is mounted to slide within the hollow standard 52. The plunger rod 58 is normally pressed upwardly by a suitably arranged compression spring 59 and its lower end is connected to a pull-rod 60 and foot pedal 61. The foot pedal 61 is designed to take under a detent lug 62, on the standard 52, when it is depressed whereby the forward end of the table 54 may be locked in lowered position. A roller 63 is journaled between the forward ends of the side bars 55, in suitable bearings 64, between a pair of rollers 65 that are larger in diameter than said roller 63 and are adapted to engage the surface of the drum 37, when the forward end of the table is locked in lowered position. By means of the compression spring and the parts above described as associated therewith, the rollers 65 are held in yielding position against the surface of the drum 37 as will be apparent. At the rear end of the table a second roller 66 is journaled between the side bars 55 of the table 54 in bracket 67 which are adjustable lengthwise of the bars 55. An endless conveyor belt 68 is trained around the rollers 63 and 66 with its upper run in engagement with the table 54 whereby it always presents an unyielding flat surface in conveying material thereover. The conveyor belt is driven through engagement of the rollers 65 with the drum 37 and in the following manner. A short shaft 68' projects from one of the bearings 64 in the rear of the roller 63. Shaft 68' carries a sprocket wheel 69 and a gear wheel 70 which are fixed against relative movement. The sprocket wheel 69 is connected by a chain 71 to a similar wheel 72 fast upon the journal of the rollers 65. A pendant arm 73 is mounted at its upper end to swing about the shaft 69. At its lower end the arm 73 carries a gear wheel 74 in mesh with the wheel 70 and a sprocket wheel 75 fixed to the gear wheel 74. A chain 76 connects the sprocket wheel 75 with a similar wheel 75' that is fixed upon the journal of the roller 66. A turn buckle 77 connects the intermediate portion of the arm 73 with the bracket 56 whereby the arm may be adjusted about the shaft 69 to take up slack in the chain 76.

Parallel guide rails 78 are mounted upon the side bars 55 of the table 54 to project over the edges of the conveyor 68. These rails are designed to guide different widths of fabric onto the drum 37 and center them relative to each other and to the drum. The fabric may be taken from a stock roll (not shown) at the rear of the conveyor, as before intimated, or it may be placed upon the conveyor in suitable lengths as desired. The guide rails, as shown in Figure 4, are adjustable transversely of the table 54 by means of notched slots 79 and bolts 80, the latter taking into the side bars 55. The notches in the slots 79 are spaced according to the different widths of fabric required in building a certain size of carcass. The drawings show two initial plies 80ᵃ and 81, of the same width, as illustrative of the manner in which one type of tire is constructed, the bead cores 82 being positioned upon these plies, and covered by two wider plies 83. Hence two notches are illustrated in the slots 79. Obviously, however, any number of notches may be provided in accordance with the number of different widths of fabric desired. The rails 78 serve to keep the fabric in a flat and unwrinkled condition during its passage to the drum 37.

A combined edge guide for the fabric and bead core guide 84 is to support the slack of the strips as they leave the conveyor until they are attached to the drum and to keep them in alignment and in centered position relative to said drum. Another and equally important purpose, however, is to set the bead strips in proper position relative to the edges of the fabric strips and in this connection I believe I am the first to provide bead setting guides adjacent the edges of a rotatable drum in apparatus of this character. The guide 84 comprises parallel supporting arms 85 projecting forwardly from the table 54, each arm being pivoted at its rear end upon one of the side bars 55 to be supported in substantially horizontal position thereon near one edge of the drum 37. Arms 85 may be thereby swung into a substantially vertical position to move the parts carried thereby, presently described, away from the drum when such parts are not in use. The rear end of each arm is constructed to form a stop 86 to limit its swinging movement, as shown in Figures 2 and 3, and a set screw 87 is provided intermediate each arm to contact the side bar 55 and adjust the position of the parts carried upon the arms relative to the surface of the drum 37. The forward ends of the arms are connected by a bar 88 disposed in parallelism with the roller 63 and adapted to extend across the drum 37. Upon the bar 88 two plates 89 are mounted to slide longitudinally. Set screws 89' are provided to clamp the plates in any desired position upon the bar 88, and an abutment 90 is affixed centrally of the bar 88 to limit the movement of the plates toward each other. Each plate carries near its outer end and against one edge of the drum 37, an arm 91 that is hinged at its rear end to the plate to be parallel with the edges of the fabric strip and to be raised or lowered relative to said plate. Upon the forward end of each arm 91, a finger 92 is affixed to project over the edge of the fabric strip. The fingers 92 on the lowered position of the arms 91 are seated in openings 93 in the forward edge of the plate and are undercut to provide a notch 94 and an overhanging lip 95, the latter projecting over the plates 89 when the fingers are in seated position to provide guides between which the narrower widths of fabric run as they pass from the conveyor. When it is desired to run wider widths of fabric onto the drum, the arms 91 are swung upwardly on their pivots to bring the notches 94 above the surface of the plates 89 and the edges of the wider strips are guided by said notches. The plates 89 may, obviously, be adjusted to run different widths of fabric onto the drum for different sizes of tires and in accordance with the adjustment of the rails 78. Also the ends of the fingers may be constructed to provide for receiving more than two different widths of fabric if desired. Each finger 92 carries a bead guide 96 arranged to project over the edge of the strip and comprising a hooked inner end constructed to receive a bead strip and position it relative to the edge of the fabric strip. Bead guides 96 are secured by screws 97 to the upper face of the fingers 92 and are slotted, as shown at 98, for adjustment across the edges of the fabric to provide for setting the bead strips at different distances from the edges of the fabric. The beads are preferably fed from the conveyor in the form of strips 82 having notched ends 100 designed to overlap and interlock in the manner shown in Figure 15ᵃ. A patch 101 is positioned beneath the overlapping ends of each bead 99 and folded over said ends. My present bead guide is particularly adapted for setting such beads relative to fabric plies superposed in band form upon a flat surfaced drum, although it may be otherwise used, as, for instance, in feeding strips from a stock roll at the rear of the conveyor.

Upon one of the standards 2, a rectangular frame 102 is mounted to swing against the forward face of the drum 37. Within the frame 102, a second rectangular frame 103 is pivoted intermediate its length to swing about a vertical axis. A horizontal shaft 104 is secured against rotation in the frame 103 and is provided intermediate its length with an adjustable collar 105. Upon one side of the collar, the shaft is provided with right hand screw threads 106, whereas the other half of said shaft is provided with left hand threads 107, the threads in each instance being formed preferably on the rear face only of the shaft. Shaft 104 carries two stitcher discs 107', having, respectively, internally threaded hub portions 108. The inside diameter of each hub portion is greater than the diameter of the shaft 104 whereby the stitchers are free to be moved along the shaft. When the frame 102 is swung against the drum 37, the stitchers are positioned against the collar 105 which is arranged to approximate the median line of the drum and consequently the fabric thereon. The frame 102 is provided with a handle 109, whereby the stitchers may be pressed against the fabric whereupon the threads of the hubs 108 will engage the threads of the shaft 106 and the stitchers will separate and gradually stitch the fabric toward its outer edges. Stitchers 107 may be used to stitch either the fabric strips or other elements of the tire, such as the sidewalls and tread portion. By means of the second frame 103 pivotally mounted on the first frame 102, the pressure of the stitchers 107 is equalized upon each side of the median line of the band. A second stitcher mechanism 110 is mounted upon one of the standards 2 to swing against the upper face of the drum. Stitcher mechanism 110 comprises a shaft or handle 111 pivoted to be swung in a horizontal position across the top of the drum. Intermediate its length, shaft 111 carries a bracket 112. A shaft 113 extends through the bracket 112 at a right angle to the handle 111. A rocker arm 114 is pivoted intermediate its length upon the shaft 113, the arm being of slightly lesser length than the space between the bead cores 82. Each end of the arm carries an approximately flat faced roller 115 which, when the mechanism is in operative position, is designed to stitch the fabric upon the drum adjacent the inside of the beads. A second rocker arm 116 is pivoted intermediate its length upon the other end of the shaft 113, said arm being of greater length than the arm 114. Each end of the arm 116 carries a stitcher wheel 117 having a concave periphery adapted to engage the toe and the base of the bead, that is to say, its upper face, considering its position upon the flat band. Stitchers 117 are each mounted upon the ends of the arm 116 to swing freely about a vertical stud 117', whereby they are free to adjust themselves accordingly should the beads 82 not be laid in exact alignment and thus prevent pinching of said beads. Rocker arm 116 comprises spaced side bars 118 between which a pair of oppositely disposed inclined mountings 119 are arranged to project downwardly toward the toes of the beads 95 when the mechanism is in operative position, and also toward the stitchers 117. Each mounting 119 comprises a sleeve 120 loosely mounted at its inner end upon the shaft 113. Mountings 120 are held against relative movement by a set screw 121. Each sleeve 120 carries in its free end the shank 122 of a stitcher carrier 123, the shanks being adjustable in their respective sleeves by means of set screws 124 whereby the carriers may be moved toward or away from the stitchers 117. Stitchers 125 and 126 are mounted respectively in the carriers 123 in an inclined position and are designed to engage the toe of the bead. Each stitcher 125 and 126 has a grooved periphery 127 for receiving the toe of the bead whereby, in conjunction with the stitchers 117, the beads are completely surrounded and stitched into uniform shape when the drum 37 is rotated. If desired, stitchers 117 may be spring pressed against the beads 82 as shown in Figure 23.

After the fabric plies and the bead strips have been properly assembled and stitched, I utilize a tread and sidewall guide 128. The guide 128 comprises a plate 129 adapted to be positioned centrally of the guide 84 and provided with a hooked rear edge 130 constructed to take over the rear edge of said guide 84. The plate is provided with vertical side flanges 131 designed to receive therebetween a tread strip 132 from the conveyor belt 68. Each flange 131 carries, at its upper edge, a sidewall guide 133 comprising a plate 134 that projects laterally from the plate 129. The side edges of the plates 134 are also provided with vertical flanges 135 designed to receive a combined sidewall strip 136 and a chafing strip 137 therebetween from the conveyor belt 68. Preferably the sidewall guides are inclined downwardly toward the drum 37 and downwardly from the plate 129, and their inner side edges project over the plate 129 to confine the edges of the tread strip between the flanges 131. This form of guide 128 provides for feeding the sidewalls upon the drum in position to overlap the edges of the tread strip, as shown in Figure 19 of the drawings.

The operation of my invention, it is believed, will be understood without further description.

The foregoing constitutes a detailed description of a preferred embodiment of my invention, but it is to be understood that changes and modifications may be resorted to in the practice of the invention without departing from the spirit thereof or the scope of the appended claims.

What I claim is:

1. Apparatus for building tires in the form of a flat band comprising, a rotatable drum, a conveyor mechanism operable through rotation of the drum to feed the component elements of the tire onto the drum, means for guiding and positioning said elements relative to each other as they are fed onto the drum, stitcher mechanism operable through rotation of the drum to stitch from the median line of the drum toward both edges thereof, and means for rotating the drum.

2. Apparatus for building tires in the form of a flat band comprising, a rotatable drum, a conveyor mechanism operable through engagement with the drum to feed material thereon, a combined fabric and bead guide between the conveyor and the drum adapted for adjustment for building different sizes of tires, and means for rotating the drum.

3. Apparatus for building tires in the form of a flat band comprising, a rotatable drum, a conveyor mechanism operable through engagement with the drum to feed material thereon, a combined fabric and bead guide mounted upon the conveyor adapted for adjustment for building different sizes of tires, and a stitcher mechanism operable through rotation of the drum to automatically stitch from the median line of the tire toward both edges thereof.

4. Apparatus for building tires in the form of a flat band comprising, a rotatable drum, a conveyor mechanism for feeding the elements of the tire onto the drum, a combined fabric and bead guide upon the conveyor for positioning the fabric plies and the bead elements relative to each other, and a removable tread and sidewall guide upon said first guide.

5. Apparatus for building tires in the form of a flat band comprising, a rotatable drum, a conveyor mechanism for feeding the elements of a tire onto the drum, a combined fabric and bead guide upon the conveyor mounted to swing toward or away from the drum, removable means upon the guide for centering the tread and sidewall elements relative to the fabric and bead elements, and stitcher mechanism operable through rotation of the drum to stitch from the median line of the drum toward both edges thereof.

6. Apparatus of the character described comprising, in combination, a rotatable expansible drum, a conveyor mechanism operable through engagement with said drum to feed the elements of the tire onto the drum, means between the drum and the conveyor adapted to guide and space the elements relative to each other as they are fed onto the drum, stitcher mechanism operable through rotation of the drum to simultaneously stitch both beads, and means for rotating the drum including a reversing mechanism.

7. In a device of the character described, in combination, a rotatable expansible drum, a conveyor mechanism adjustable in a vertical plane into and out of driving engagement with said drum, a swinging frame upon the conveyor comprising pivoted edge guides for the fabric, and a bead guide upon each said edge guides.

8. In a device of the character described, in combination, a rotatable drum for receiving the elements of a tire, and a notched fabric guide adjacent each edge of the drum mounted for adjustment across the face of the drum said fabric guide having a bead guide mounted thereon.

9. In a device of the character described, in combination, a rotatable drum, a conveyor mechanism adjustable in a vertical plane into and out of driving engagement with said drum, adjustable guide bars upon the conveyor mechanism for receiving fabric plies therebetween, a swinging frame upon the conveyor comprising pivoted edge guides for the fabric, and a bead guide on each said edge guides.

10. In apparatus of the class described, in combination, a rotatable drum, a support in the plane of the drum, a frame pivoted upon the support to rock about a horizontal axis one end of the frame overhanging the drum, and a conveyor mechanism carried by the frame including a flanged roller adapted to engage the drum.

11. Apparatus for building tires in the form of a flat band comprising a rotatable drum, a support for holding a strip of tire building material in alignment with the upper periphery of the drum, means adjustable over the support for guiding the strip of tire building material centrally onto the drum, said means comprising spaced guide rails movable toward and from each other over the support, and bead strip guides pivoted on the support and adapted to overlie the drum adjacent the edges thereof, the bead strip guides being adjustable toward and from each other.

12. Apparatus for building tires in the form of a flat band comprising a rotatable drum, a support for holding a strip of tire building material in alignment with the upper periphery of the drum, means adjustable over the support for guiding the strip of tire building material centrally onto the drum, and bead strip guides pivoted on the support and adapted to overlie the drum adjacent the edges thereof.

13. Apparatus for building tires in the form of a flat band comprising a rotatable drum, a support for holding a strip of tire building material in alignment with the upper periphery of the drum, and means adjustable over the support for guiding the strip of tire building material centrally onto the drum, said means comprising spaced guide rails movable toward and from each other over the support.

14. Apparatus for building tires in the form of a flat band comprising a rotatable drum, a support for holding a strip of tire building material in alignment with the upper periphery of the drum, and means adjustable over the support for guiding the strip of tire building material centrally onto the drum.

15. Apparatus for building tires in the form of a flat band comprising a rotatable drum, means for guiding strips of bead material onto the upper periphery of the drum, and means for stitching about the bead strips at the upper periphery of the drum, said means including a stitcher unit pivoted to swing onto the upper periphery of the drum and including sets of rollers so shaped and arranged as to stitch against the upper surfaces of each bead strip and against adjacent portions of a tire carcass on said drum.

16. Apparatus for building tires in the form of a flat band comprising a rotatable drum, means for guiding strips of bead material onto the upper periphery of the drum, and means for stitching about the bead strips at the upper periphery of the drum, said means including a stitcher unit pivoted to swing onto the upper periphery of the drum.

17. Apparatus for building tires in the form of a flat band comprising a rotatable drum, means for guiding plies of tire building material onto the upper periphery of the drum, means for guiding strips of bead material onto the upper periphery of the drum, and means for stitching about the bead strips at the upper periphery of the drum, said means including a stitcher unit pivoted to swing onto the upper periphery of the drum.

18. Apparatus for building tires in the form of a flat band comprising a rotatable drum, means for guiding plies of tire building material onto the upper periphery of the drum, means for guiding strips of bead material onto the upper periphery of the drum, and means for stitching about the bead strips at the upper periphery of the drum, said means including a stitcher unit movable onto the upper periphery of the drum.

WILLIAM C. STEVENS.